United States Patent Office 2,955,041
Patented Oct. 4, 1960

2,955,041

FLAVORING AGENTS AND PROCESS FOR IMPARTING A MEAT-LIKE FLAVOR TO AN EDIBLE COMPOSITION

James J. Broderick, River Edge, and Lino L. Linteris, Demarest, N.J., assignors to Lever Brothers Company, New York, N.Y., a corporation of Maine No Drawing. Filed Dec. 11, 1958, Ser. No. 779,536

7 Claims. (Cl. 99—140)

This invention is concerned with novel processes for imparting a meat-like flavor to edible materials, and with compositions which have been given a meat-like flavor by incorporating in them small amounts of certain derivatives of mercapto-acetaldehyde.

It is well known that each type of meat has its own unique flavor. At the same time, however, it is also recognized that a great similarity exists between the flavors of various types of meat. For example, a person tasting a particular kind of meat for the first time would be able to identify the flavor as that of some kind of meat, although he would not be able to identify the particular kind of meat. It may therefore be said that there exists a basic flavor fundamental to most, if not all, kinds of meat, and the individual flavors of particular types of meat are variations of the one basic flavor.

It has now been discovered that it is possible to impart a basic meat-like flavor to meatless edible compositions. Such a result is accomplished by adding to the meatless composition small amounts of certain stabilized derivatives of mercapto-acetaldehyde.

Mercapto-acetaldehyde, as its name indicates, possesses a mercapto group and an aldehyde group. The derivatives of mercapto-acetaldehyde used in the present invention are those in which at least one of the functional groups of the compound is involved in an acetal type linkage. The acetal type linkage may be at either of the functional groups, i.e. the mercapto group of the mercapto-acetaldehyde may be linked to the aldehyde group of another compound, or the aldehyde group of the mercapto-acetaldehyde may be linked to the alcohol or mercapto group of another compound. It is to be understood that the expression acetal type linkage includes not only acetal linkages per se, but also hemiacetals, mercaptals, and hemi-mercaptals. The compounds useful for forming the acetal type linkage with the mercapto-acetaldehyde are alcohols, mercaptans and aldehydes having from 1 to 5 carbon atoms. The formation of the acetal type linkage is thought to confer on the mercapto-acetaldehyde molecule stability needed to be useful in the invention.

Some of the derivatives of mercapto-acetaldehyde used in the present invention contain a free mercapto group. The sodium and the potassium salts of such free mercapto groups may be formed, and the resulting salts are also useful in the present invention.

Several compounds may be mentioned to illustrate useful stabilized derivatives of mercapto-acetaldehyde. The freshly prepared diethyl acetal of mercapto-acetaldehyde is a preferred compound, as are the hemi-mercaptals of mercapto-acetaldehyde. The mercapto group of one molecule of mercapto-acetaldehyde can react with the aldehyde group of another molecule of the compound and produce a dimer known as 2,5-dihydroxy-1,4-dithiane, which is also useful in the present invention. A particularly useful compound is that formed by the reaction between the mercapto group of mercapto-acetaldehyde and the aldehyde group of xylose.

The compounds of the present invention may be used individually or mixed with each other. They may also be used simultaneously with other flavor imparting materials. Flavor imparting materials useful in connection with the compounds of the present invention include such materials as sodium glutamate, protein hydrolyzates, spices, garlic, smoked flavors, aromatics such as capric acid and other fatty acids, thioaldehydes such as isovaleric thioaldehyde, ketones such as maltol, aldehydes such as propionaldehyde, phenols such as eugenol, and nitrogenous materials such as skatole and indole.

It is a distinct advantage of the present invention that the compounds used therein impart a fundamental meat-like flavor to which there can be added various known flavoring ingredients for specific effects. It is thus possible to obtain great flexibility in flavor, and to simulate the flavor of many specific types of meat.

Although the present invention is primarily of interest to impart meat-like flavor to meatless edible compositions, the invention may also be adopted to improving the flavor of meat or meat-containing compositions.

The compounds of the present invention may be used to impart flavor to many various types of foodstuffs, including meat substitutes, soups, sauces, sandwich spreads and the like. An example of such a material is a simulated meat product formulated from 20% vegetable oil and 14% vegetable protein, along with water. To this composition 2,5-dihydroxy-1,4-dithiane was added in amounts varying from 0.01 to 0.02%. The mixture was then autoclaved at 10 pounds' gauge pressure for 70 minutes. The resulting product had an agreeable, distinctly meat-like flavor.

It was found that the addition of minute amounts of a pentose, for example xylose, at a concentration of from about 0.015 to 0.07%, to the above composition increased the stability of the meat-like flavor.

In place of 2,5-dihydroxy-1,4-dithiane, other compounds of the invention such as the diethyl acetal of mercapto-acetaldehyde, hemi-mercaptals of mercapto-acetaldehyde or the xylose derivative of mercapto-acetaldehyde may be employed in a similar manner. In general, the preferred amount is from about 0.01 to about 0.06% by weight of the flavoring compounds in the composition, although a weak meat-like flavor may sometimes be obtained at concentrations as low as 0.005%.

The following examples are given solely for purposes of illustration and are not to be considered as limiting the invention to these embodiments. Many modifications will be apparent to those skilled in the art without departing from the spirit or scope of the invention.

EXAMPLES

The substances shown in Table II below were each added in the amounts stated to the corresponding numbered simulated meat product shown in Table I.

Table I

| Ex. No. | 75 I.V. Hydrog. Cottonseed oil | Unhydrog. Cottonseed oil | Soy Protein | Cracker Meal | Gelatin | Carboxymethyl cellulose | Na$_4$P$_2$O$_7$ |
|---|---|---|---|---|---|---|---|
| 1 | | | 25 | 15 | 1 | 1 | 0.2 | 0.2 |
| 2 | 20 | | | 15.9 | 1 | 1 | 0.35 | 0.2 |
| 3 | 20 | | | 15.9 | 1 | 1 | 0.35 | 0.2 |
| 4 | | | 25 | 15 | 1 | 1 | 0.2 | 0.2 |
| 5 | | | 25 | 15 | 1 | 1 | 0.2 | 0.2 |
| 6 | | | 25 | 15 | 1 | 1 | 0.2 | |
| 7 | | | 20 | 14.8 | 1 | 1 | 0.35 | 0.2 |
| 8 | | | 25 | 15 | 1 | 1 | 0.2 | |
| 9 | | | 20 | 14.8 | 1 | 1 | 0.35 | 0.2 |
| 10 | | | 20 | 14.8 | 1 | 1 | 0.35 | 0.2 |
| 11 | | | 20 | 14.8 | 1 | 1 | 0.35 | 0.2 |
| 12 | | | 20 | 14.8 | 1 | 1 | 0.35 | 0.2 |

Sufficient coloring was added to each mixture; water was present in an amount to make 100%. The pH was adjusted to 5.5–7.0. The mixtures were autoclaved at 10 pounds per sq. inch gauge pressure for 70 minutes.

*Table II*

| Ex. No. | Additive | Percent Amount | Flavor |
|---|---|---|---|
| 1 | None | | Soy protein-Low intens. |
| 2 | Diethylacetal of mercapto-acetaldehyde. | 0.005 | Weakly meat-like. |
| 3 | ----do---- | 0.03 | Meat-like. |
| 4 | {Diethylacetal of mercapto-acetaldehyde and Xylose. | 0.01<br>0.07 | }Meat-like (slightly browned). |
| 5 | 2,5-dihydroxy-1,4-dithiane | 0.009 | Weakly meat-like. |
| 6 | ----do---- | 0.02 | Meat-like. |
| 7 | {2,5-dihydroxy-1,4-dithiane and Xylose. | 0.01<br>0.015 | } Do. |
| 8 | {2,5-dihydroxy-1,4-dithiane and Xylose. | 0.01<br>0.07 | }Meat-like (browned). |
| 9 | Hemimercaptal of Xylose and Mercaptoacetaldehyde. | 0.03 | Meat-like. |
| 10 | ----do---- | 0.06 | Do. |
| 11 | ----do---- | 0.075 | Strong meat-like. |
| 12 | ----do---- | 0.15 | Do. |

The term "browned" means that the product had a caramelized, seared, burnt taste.

EXAMPLE 13

To tomato sauce was added the flavoring material of Example 7. These agents imparted an agreeable meat-like flavor to the sauce.

EXAMPLE 14

The flavoring material of Example 7 was added to green peas, which were then canned and sterilized. This provided a desirable meat-like flavor to the vegetable.

The products of Examples 2–8, were also aged at 70° F. for 90 days. After this aging period, the products which did not contain xylose had lost some of their meat-like flavor and aroma, but the flavor characteristics of those to which xylose had been added were more meat-like.

As stated above, the object of this invention is to produce a basic meat flavor to which can be added other spices, etc. to produce specific effects. For example, a ham flavor can be produced by adding to the product of Example 4 a mixture containing sodium glutamate, casein hydrolyzate, salt, pepper, clove, mustard, and smoke. When a chicken flavor is desired, a flavor mixture containing sodium glutamate, casein hydrolyzate, salt, celery, and onion can be added to any of the products of Examples 4–12.

What is claimed is:

1. A process for imparting a meat-like flavor to an edible composition, said process comprising mixing with the composition from about 0.005 to about 0.06% by weight of a flavoring agent which is a derivative of mercapto-acetaldehyde in which the mercapto-acetaldehyde is linked by an acetal type linkage to a compound selected from the group consisting of alcohols, mercaptans and aldehydes having from 1 to 5 carbon atoms.

2. An edible composition having a meat-like flavor and comprising from about 0.005 to about 0.06% by weight of a flavoring agent which is a derivative of mercapto-acetaldehyde in which the mercapto-acetaldehyde is linked by an acetal type linkage to a compound selected from the group consisting of alcohols, mercaptans and aldehydes having from 1 to 5 carbon atoms.

3. An edible composition having a meat-like flavor and comprising from about 0.015 to about 0.07% of xylose and from about 0.005 to about 0.06% by weight of a flavoring agent which is a derivative of mercapto-acetaldehyde in which the mercapto-acetaldehyde is linked by an acetal type linkage to a compound selected from the group consisting of alcohols, mercaptans and aldehydes having from 1 to 5 carbon atoms.

4. An edible composition having a meat-like flavor and comprising from about 0.01 to about 0.06% by weight of 2,5-dihydroxy-1,4-dithiane.

5. An edible composition having a meat-like flavor and comprising from about 0.01 to about 0.06% by weight of the diethyl acetal of mercapto-acetaldehyde.

6. An edible composition having a meat-like flavor and comprising from about 0.01 to about 0.06% by weight of the hemi-mercaptal of mercapto-acetaldehyde.

7. An edible composition having a meat-like flavor and comprising from about 0.01 to about 0.06% by weight of the dithioacetal formed by xylose and mercapto-acetaldehyde.

References Cited in the file of this patent

UNITED STATES PATENTS

| 2,560,531 | Kipnis et al. | July 17, 1951 |
| 2,594,379 | Barch | Apr. 29, 1952 |